A. BOHNENBLUST.
STRAW FEEDER.
APPLICATION FILED APR. 26, 1920.

1,375,204.

Patented Apr. 19, 1921.

Inventor
Arnold Bohnenblust.

Witness

By C. A. Snow & Co.
Attorneys

UNITED STATES PATENT OFFICE.

ARNOLD BOHNENBLUST, OF RILEY, KANSAS.

STRAW-FEEDER.

1,375,204.

Specification of Letters Patent.   Patented Apr. 19, 1921.

Application filed April 26, 1920.   Serial No. 376,601.

*To all whom it may concern:*

Be it known that I, ARNOLD BOHNENBLUST, a citizen of the United States, residing at Riley, in the county of Riley and State of Kansas, have invented a new and useful Straw-Feeder, of which the following is a specification.

This invention aims to provide novel means for spacing the feeding members in a straw feeder for agricultural machines.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
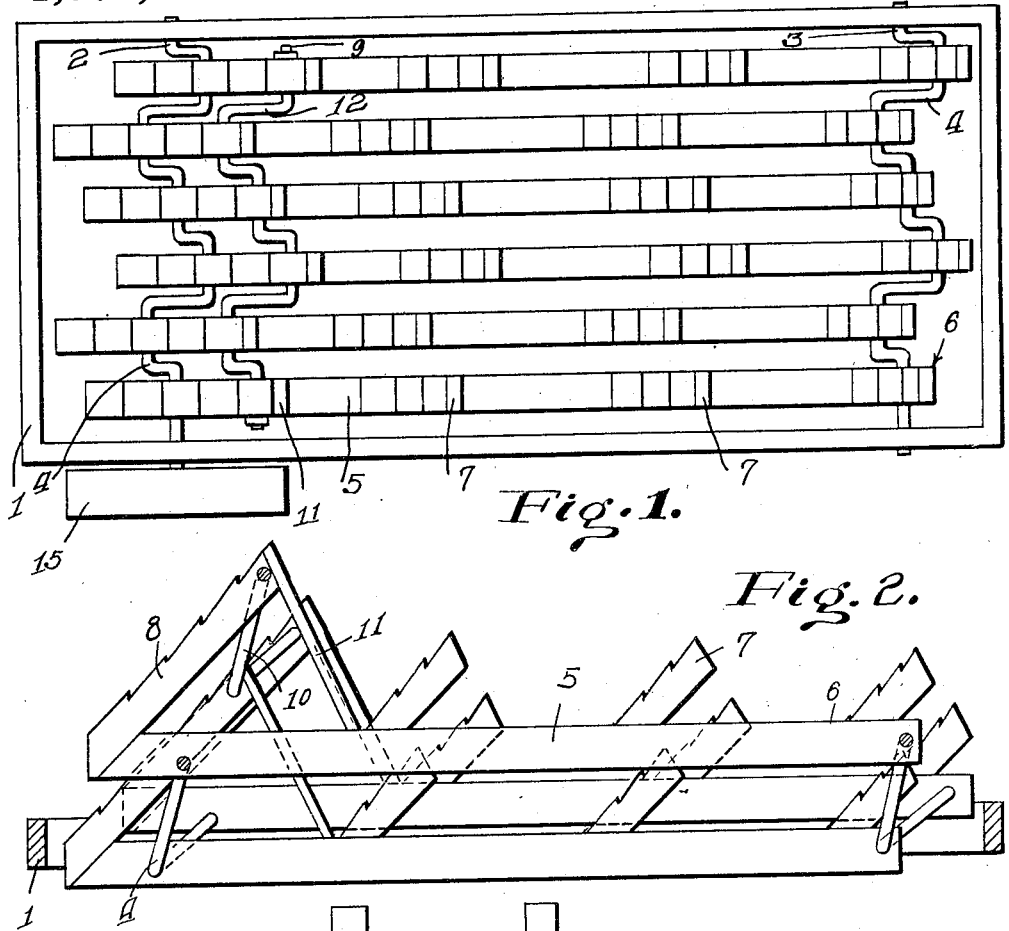
Figure 2:
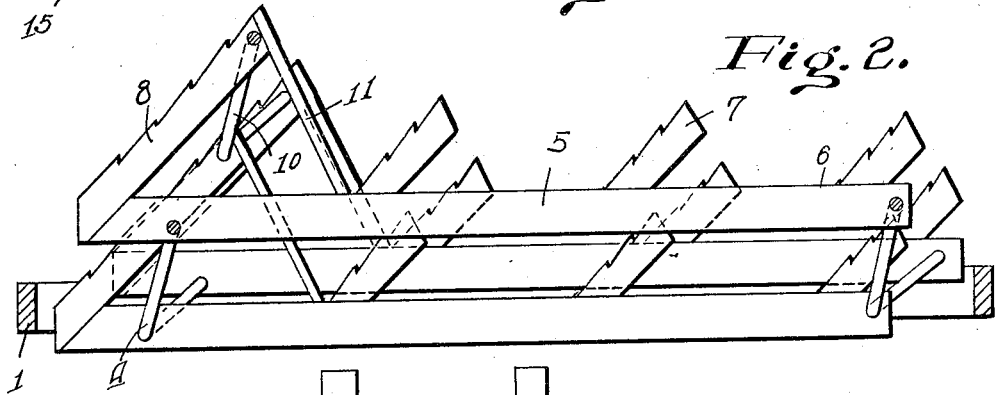
Figure 3:
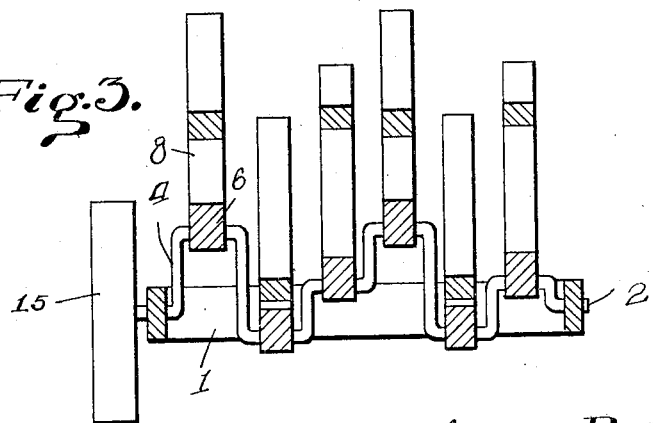

Figure 1 shows in top plan, a device constructed in accordance with the invention; Fig. 2 is a longitudinal section wherein parts appear in elevation; and Fig. 3 is a transverse section.

The numeral 1 denotes a support of any desired sort. First shafts 2 and 3 are journaled in the support 1 adjacent to the ends thereof, the shafts 2 and 3 having cranks 4. The numeral 15 denotes any suitable means for rotating the shaft 2. Feeding members 6 are provided, the same including base bars 5 carried by the cranks 4, and inclined fingers 7 and 8 mounted on the base bars. The cranks 4 are so set with respect to each other, that, when the shaft 2 is rotated, one feeding member 6 will be moving forwardly while the adjoining feeding member is moving backwardly. The construction above described is common in the art.

After a more or less extended period of use, the bearings of the shafts 2 and 3 in the support 1, and the bearings of the cranks 4 in the feeding members 6 become worn. As a result, the feeding members swing transversely toward and away from each other, and not infrequently strike together at their upper ends, with obviously disastrous results. The present invention aims to provide novel means for spacing the feeding members 6, so that they cannot knock together, as aforesaid.

Having in mind the accomplishment of the result above alluded to, a second shaft 9 is provided, the same having cranks 10 journaled in the fingers 8 at one end of the device, the side portions 12 of the cranks then serving to space the feeding members 6, even though the bearings be somewhat worn, as hereinbefore alluded to. The fingers 8 which carry the second crank shaft 9 may be sustained and supported from the base bars 5 by means of braces 11.

When the feeding members 6 are in operation, the movement of the feeding members with respect to each other is somewhat complex, but it is to be observed that, notwithstanding the complexity of the aforesaid movement, the second crank shaft 9 affords a simple means whereby the feeding members are spaced from each other.

Having thus described the invention, what is claimed is:—

1. In a feeder of the class described, a support; first shafts journaled in the support and having cranks; feeding members extended between the first shafts and mounted on the cranks; and a second shaft independent of the support and having cranks mounted in the feeding members, the side portions of the cranks of the second shaft constituting means for spacing the feeding members.

2. In a feeder of the class described, a support; first shafts journaled in the support and having cranks; feeding members extended between the first shafts and mounted on the cranks, the feeding members comprising base bars and inclined fingers on the bars; a second shaft independent of the support and having cranks, one of said cranks being mounted in one finger of each base bar, the side portions of the cranks of the second shaft coöperating with the feeding members to space the feeding members; and braces extended between said fingers and the corresponding base bars.

In testimony that I claim the foregoing as my own, I have hereto affixed my signature in the presence of two witnesses.

ARNOLD BOHNENBLUST.

Witnesses:
  GEORGE BOHNENBLUST,
  MARTIN BOHNENBLUST.